Aug. 10, 1965   C. O. BARBRE   3,199,755
METHOD OF TRIMMING SHEET MATERIAL
Original Filed Aug. 9, 1961   2 Sheets-Sheet 1

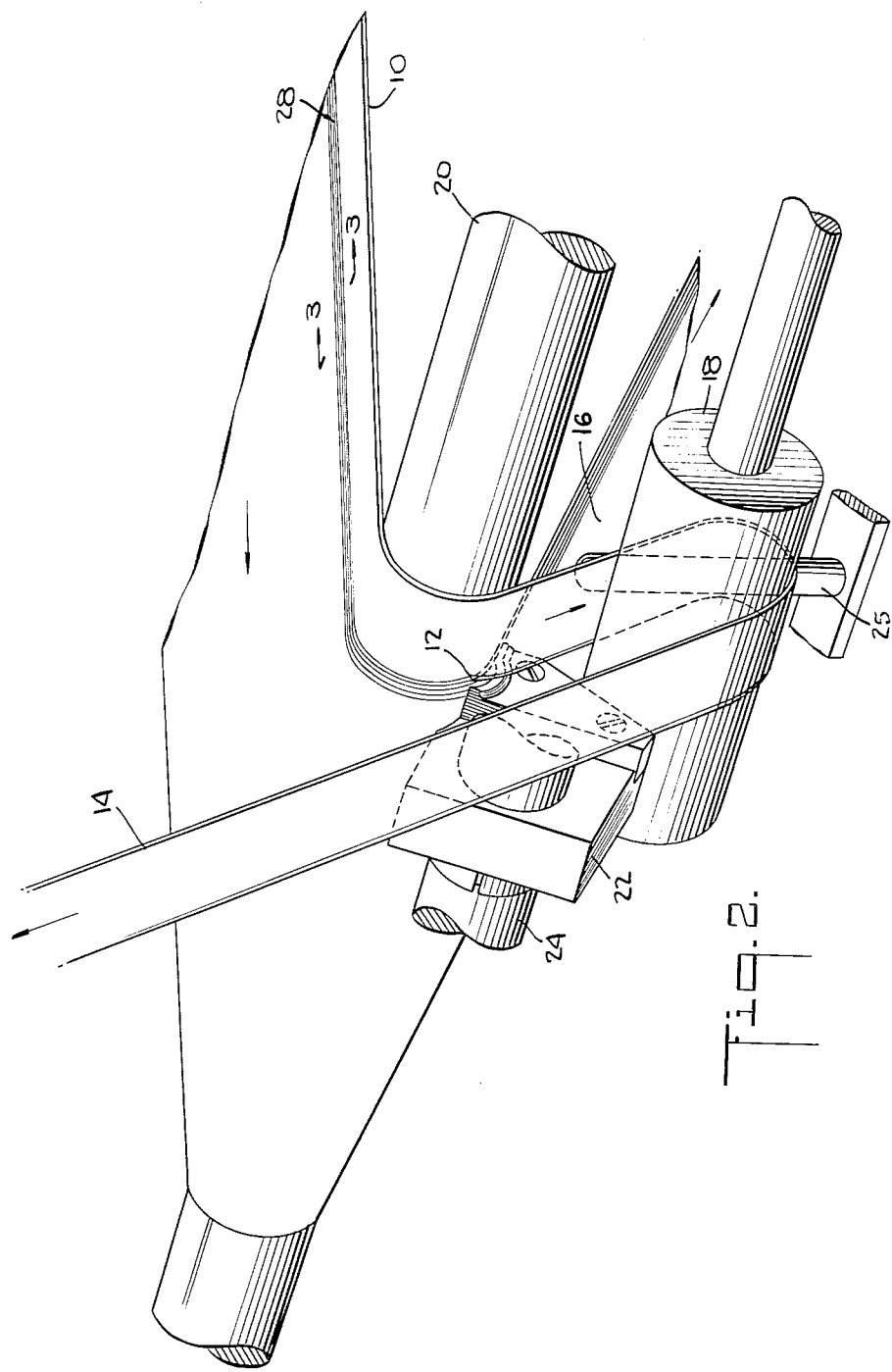

3,199,755
METHOD OF TRIMMING SHEET MATERIAL
Charles O. Barbre, Belvidere, N.J., assignor to Celanese Corporation of America, New York, N.Y., a corporation of Delaware
Continuation of application Ser. No. 130,328, Aug. 9, 1961. This application Nov. 23, 1964, Ser. No. 420,479
1 Claim. (Cl. 225—3)

This application is a continuation of application Serial No. 130,328 filed August 9, 1961, now abandoned.

This invention relates to a method of trimming cellulose triacetate sheet material to form tough-edged narrower strips therefrom. More particularly, this invention relates to a novel method for forming a tough-edged sheet material from an originally wider sheet, this method comprising establishing a partial severance of the initially wider sheet material into at least two narrower free ends, maintaining a free severance point from which the wider sheet separates into the narrower ends, and continuously passing the wider sheet past the free severance point to lengthen the narrower ends while shortening the wider sheet and while maintaining a force on one of the narrower ends in a direction different from the direction of force maintained on another narrower end. The invention is particularly suited for trimming irregular side edges off sheet material.

Cellulose triacetate sheet materials have a wide variety of applications. One of the most important is in photographic films wherein cellulose acetates with an acetic acid value above the acetone soluble range (greater than 57.5% acetic acid) are utilized in the formation of film. Heretofore, such cellulose triacetate films generally have been subjected to a cutting action in order to provide a straight edge therefor. However, the resultant film has exhibited certain undesirable characteristics. For example the sharp edge formed as a result of the cut will contain sites which function as initial junctures for the propagation of cracks across the film. In addition, "trim hairs" and "trim dust" can be formed as undesired by-products of the cutting action and can accumulate upon the film surface, which situation is intolerable for most applications of the film will gradually abrade and mar the surface of the film. The probable reason for such deficiencies is that the knife edges become dull unavoidably because of use. For example, film edges shear-trimmed with a sharp, properly set knife, at the start of its use, will give a trimmed film with clean strong edges with only a very slight amount of trim dust formed. The knives becomes dull with use and the film edges become rough and weak. The film edges become weak because of the formation of microscopic cracks. In addition, the formation of trim dust becomes greater as the knives get dull, and also trim hairs can develop.

Accordingly, it is an object of this invention to provide a novel method for trimming a cellulose triacetate sheet material whereby an edge characterized by unusual toughness is formed.

Another object is to provide a method for trimming a cellulose triacetate photographic film whereby a toughened crack-resistant edge is formed.

Additional objects will become apparent hereinafter.

In accordance with one aspect of the invention, a sheet material is initially parted at one or more places along one end thereof, thereby initiating one or more partial severances at this end of the material. This effectively divides the sheet end into two or more narrower ends. A free severance point is continuously maintained between each of the thus formed narrower ends and the material is pulled apart, i.e., torn apart, commencing from the initial partial severance points. The tearing of the sheet material is carried out by continuously passing the sheet through the free severance point to thereby continuously lengthen the narrower film ends while at the same time continuously shortening the initially wider sheet. The tearing is carried out by maintaining a force on each of the narrower film ends. It is important that the direction of force applied to an end be different from the direction of force applied to an adjacent end. Otherwise, a satisfactory tear line is not achieved.

I have found that by virtue of this simple method, that is, by subjecting a sheet material to a tearing action with the directions of the tearing forces on adjacent parted ends of the material being different from one another, an unusually tough, tear-resistant edge is developed, which edge shows unusual ability to withstand abrasion, propagation of tears from edge-surface irregularities and the like. No trim dust or trim hairs develop when the tearing is done. While the precise reason for the vastly improved toughness of the thus-formed edges is not completely understood, it is believed that this results, at least in part, from the fact that when the sheet material is subjected to a tearing rather than a cutting action, such tearing action permits an inherent latitude or degree of freedom not present in a cutting action. That is, in contradistinction to cutting wherein the cutting action occurs both through the grains making up the sheet material as well as along grain boundaries, when the sheet material is torn there is sufficient latitude that the tear will accommodate itself to go along the tiny grain boundaries, that is, along the edges of the grains but not through such grains. Accordingly, the thus-torn edge is essentially made up of grain boundaries, i.e., the edges of the individual grains making up the sheet, so that at the tear juncture only grain boundaries are exposed and not any intragranular surfaces. Accordingly, such an edge is considerably tougher and more resistant to tearing and the like than the cut edges provided heretofore.

It is to be noted, however, that the above explanation is only a partial explanation since it does not account for the fact that the method of the invention is applicable only to cellulose triacetate having acetyl contents (calculated as acetic acid) in excess of 57.5%. Other cellulosic sheet materials, including secondary cellulose acetates, cellulose acetate butyrates, cellulose propionates and other cellulose mixed esters or ethers, will not produce a tough edge when subjected to the tearing action described above. Similarly non-cellulosic sheet materials, such as polyesters, nylon, polypropylene and polyethylene do not behave similarly to cellulose triacetate in this respect.

The invention will be more fully understood by reference to the accompanying drawing, wherein:

FIG. 2 is a perspective view of the sheet material and tearing operation of FIG. 1.

Figure 1:
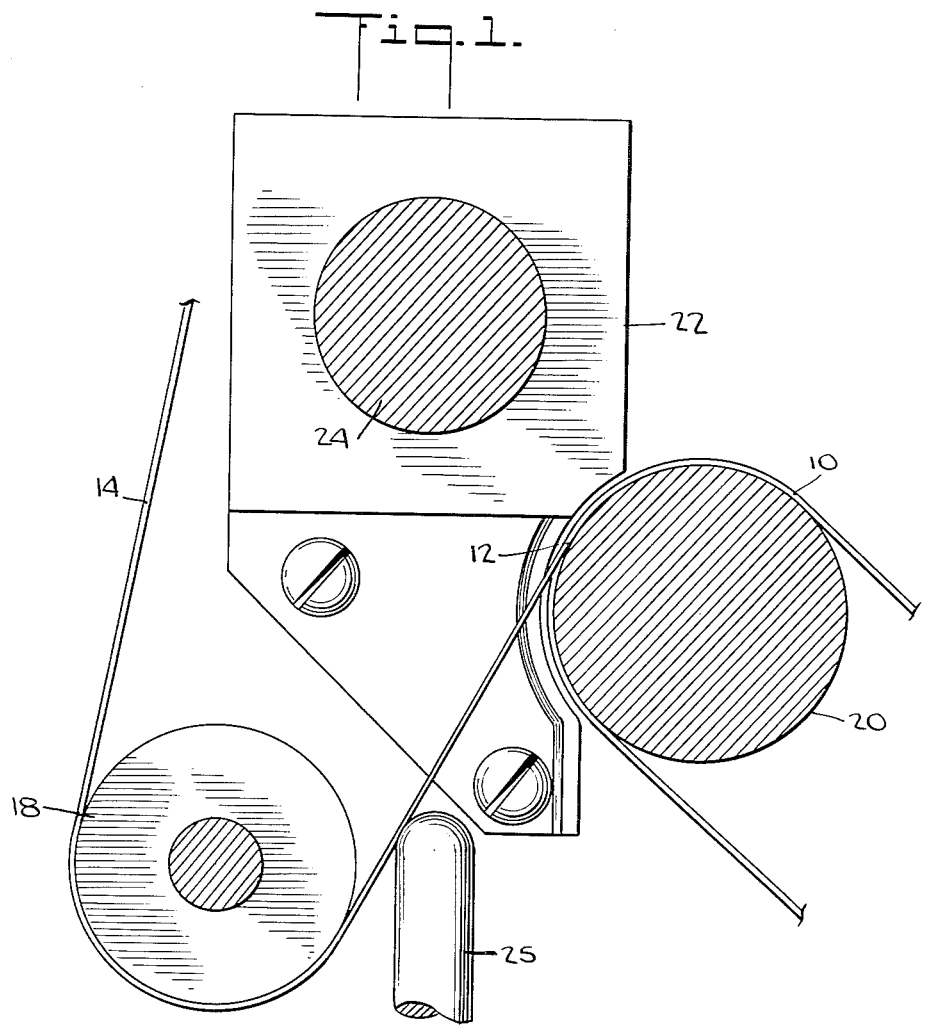
FIG. 1 is a side view showing the sheet material being torn by the application of forces operating in different planes.

Referring to the drawings, the initial sheet material, generally designated by the reference numeral 10, is originally torn or otherwise partially severed to form a site for further propagation of the tear. This initial severance point 12 is placed in such position that one or more of the resultant end strips will be of the desired width. To help maintain the severance point stationary it is conveniently placed just beyond supporting roller 20, over which the initial sheet material passes. Tear block 22, mounted on support shaft 24 helps to avoid lateral displacement of the severance point. The tearing of the sheet material is readily carried out by any one of a number of means, one of the most convenient being to simply pull one of the narrower ends, the edge trim 14 over roller 18 which is out of the plane of the path of the trimmed stock 16. Pressure pin 25 bears against the moving edge trim 14 and helps to maintain it in the desired position. Rollers 18 and 20 may desirably be arranged in such manner that roller 18 operates to pull the trim into a plane different than that plane defined by the traverse of the sheet material. As the sheet material passes over roller 20 and the ends thereof are pulled in different directions a tearing force is applied at the free severance point 12 so that as sheet 10 continuously advances the tear progresses throughout the length thereof.

When the invention is utilized in connection with an edge trimming operation, the width of the film on roller 18 is considerably narrower than the width of the remaining film and another roller, not shown, comparable to roller 18, takes up the trimming at the opposite edge. The trimmed edges on roller 18 and its counterpart may be reworked to recover their polymer content.

Figure 3:
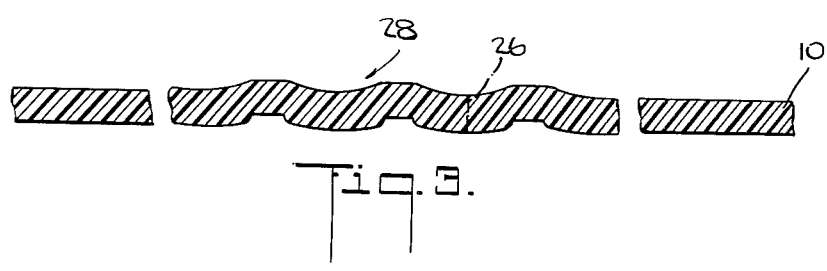
FIG. 3 is a detailed cross section of a portion of the original sheet material (through plane 3—3 of FIG. 2) showing a knurled edge and the location of the tear relative thereto.

I have found that the method of my invention finds particular application in forming tough edges for photographic film. I have further found that once the free severance point is established and the sheet set in motion, the tear will continue to propagate in an essentially straight line. However, in accordance with another embodiment of the invention, in order to insure that the tear conform to a straight line the untorn sheet material 10 can be initially provided with a straight guide line 26, which as shown in FIG. 3 is conveniently a groove in a knurled edge 28. The embossing of sheeting with a knurled wheel along each edge is common to prevent too close contact between adjacent layers. Knurling forms small indentations on one face of the sheeting and corresponding small projections on the opposite face. Where each edge of the sheeting has several parallel knurled grooves, one of the outer grooves on each edge may be used as a straight guide line for tearing while the inner grooves remain on the trimmed sheet material to perform their function. A cross section of a typical knurled edge is shown in FIGURE 3 with dotted line 26 showing the path of the tear.

My invention finds particular application when using sheet material having a thickness of at least .00088 inch and preferably from about .0035 to .010 inch.

An additional advantage of the present invention resides in the fact that whereas the use of a knife to cut the film to form an edge results in the accumulation of "trim dust" and "trim hairs" upon the film surface, which dust and hairs tend to scratch and mar the surface and which are intolerable for further processing operations, the tearing method described herein does not form any such dust or hairs as objectionable by-products. Further, if a knife is used, over a period of time the knife edge will become dull so that the sheet edge thus formed will not be of uniform quality. The tearing method of the present invention obviates the presence of a knife, and consequently the resultant edge is of uniform quality throughout the length of the film.

The sheet material used in conjunction with the method of my invention is formed by casting from a solution thereof. The solution, or dope, contains the cellulose triacetate, a solvent and usually a plasticizer. A typical dope contains:

| | Percent |
|---|---|
| Cellulose triacetate | 16 |
| Methylene chloride-aliphatic alcohol mixture 90–10 by wt. | 81.6–79.2 |
| Plasticizer | 2.4–4.8 |

The viscous dope is filtered to remove substantially all of any solid particles and then deaerated by heating to the boiling point, by applying a vacuum or by standing for a long period. The dope is then applied to a moving casting surface from a doctor hopper or a pressure or extrusion hopper. The highly polished casting surface may be a steel surface or a band (belt) surface.

A sufficient amount of solvent is removed from the dope web by a current of warm gas so that, when the film is stripped from the casting surface it is self supporting. This stripped film is passed through a drier to remove the remainder of the solvent.

The usual plasticizer is a triaryl phosphate, such as triphenyl phosphate and may be present in amounts up to about 40 wt. percent (based on the weight of the cellulose triacetate), and preferably from about 10 to 30 wt. percent. For photographic film the preferred proportion of plasticizer is between about 10 and 15 wt. percent.

Other plasticizers which may be used include cresyl diphenyl phosphate, tricresyl phosphate; phthalate esters such as dimethoxyethyl phthalate, diethoxyethyl phthalate, diethyl phthalate, dimethyl phthalate and dibutyl phthalate; esters of aliphatic dicarboxylic acids, such as dimethoxyethyl adipate, diethoxyethyl adipate; esters of glycols and higher polyhydric alcohols, such as diethylene glycol dicaprylate, triethylene glycol dicaprylate, glyceryl tripropionate, sucrose octoacetate and pentaerythritol tetrapropionate.

It is to be understood that the foregoing detailed description is given merely by way of illustration and that many variations may be made therein without departing from the spirit of my invention.

The embodiments of the invention in which an exclusive property or privilege is claimed are defined as follows:

A process of continuously tearing a longitudinally pre-scored length of cellulose triacetate sheet material into at least two sheet portions, which comprises advancing said pre-scored sheet in a substantially horizontal plane to a tearing station provided by first and second roller surfaces disposed in different horizontal and vertical planes with respect to one another, wrapping said sheet material upon said first roller surface and while said sheet material is so wrapped, applying a restraining force thereto immediately adjacent said pre-scored line while simultaneously directing one portion of said sheet material in wrapping relation upon said second roller surface while continuing to advance the remaining portion of said sheet material in wrapping relation upon said first roller surface, whereby said sheet material is torn longitudinally along said pre-scored line during application of said restraining force and said one and said remaining portions of said sheet material are caused to travel in different horizontal and vertical planes from said first and second roller surfaces.

References Cited by the Examiner

UNITED STATES PATENTS

| 876,008 | 1/08 | Overbury | 225—3 X |
|---|---|---|---|
| 2,913,160 | 11/59 | Fleming | 225—99 |

FOREIGN PATENTS

| 716,806 | 1/42 | Germany. |
|---|---|---|
| 256,566 | 12/26 | Great Britain. |

ANDREW R. JUHASZ, *Primary Examiner.*